(12) United States Patent
Rider et al.

(10) Patent No.: US 9,412,104 B2
(45) Date of Patent: Aug. 9, 2016

(54) TRANSACTION PRODUCT WITH MOVABLE MEMBER

(71) Applicant: TARGET BRANDS, INC., Minneapolis, MN (US)

(72) Inventors: Sage C. Rider, St. Louis Park, MN (US); David Ledsinger, Golden Valley, MN (US); Ted C. Halbur, Lino Lakes, MN (US); Megan B. Engeseth, Minneapolis, MN (US); Cynthia Emery, Schaumburg, IL (US); Michael Esposito, Mt Prospect, IL (US); David Boyer, Madison, WI (US)

(73) Assignee: Target Brands, Inc., Minneapolis, MN (US)

( * ) Notice: Subject to any disclaimer, the term of this patent is extended or adjusted under 35 U.S.C. 154(b) by 396 days.

(21) Appl. No.: 14/137,371

(22) Filed: Dec. 20, 2013

(65) Prior Publication Data
US 2014/0183082 A1 Jul. 3, 2014

Related U.S. Application Data

(60) Provisional application No. 61/746,749, filed on Dec. 28, 2012.

(51) Int. Cl.
*G06K 5/00* (2006.01)
*G06Q 20/34* (2012.01)
(Continued)

(52) U.S. Cl.
CPC ............ *G06Q 20/352* (2013.01); *B42D 15/008* (2013.01); *B42D 15/0073* (2013.01);
(Continued)

(58) Field of Classification Search
CPC ............ B42D 15/0073; B42D 15/008; B42D 15/0086; B42D 25/285; G06Q 20/12; G06Q 20/20; G06Q 20/28; G06Q 20/341; G06Q 20/346; G06Q 20/347; G06Q 20/349; G06Q 20/352; G06Q 30/0207

USPC ................................................. 235/380, 487
See application file for complete search history.

(56) References Cited

U.S. PATENT DOCUMENTS

| 744,545 | A | 11/1903 | Hervey |
| 889,549 | A | 6/1908 | Roy |

(Continued)

FOREIGN PATENT DOCUMENTS

| GB | 2277482 A | 2/1994 |
| GB | 2428236 A | 1/2007 |

(Continued)

OTHER PUBLICATIONS

Office Action from Canadian Patent Application No. 2,838,143, mailed Apr. 2, 2014 (2 pages).

(Continued)

*Primary Examiner* — Seung Lee
(74) *Attorney, Agent, or Firm* — JoAnn M. Seaton; Griffiths & Seaton PLLC

(57) ABSTRACT

A transaction product includes a primary member, an auxiliary member, and a machine-readable account identifier. The primary member defines a first panel and a second panel, the first panel defines two or more embossed sections defining interior ledge segments that define a track therebetween, and the first and second panels are coupled to one another such that the track is interposed between the first and second panels. The auxiliary member is interposed between the first and second panels, is partially positioned within the track, and is configured to move within the track in one or more of a first direction and a second direction. Movement of the auxiliary member is limited by interaction between the auxiliary member and the interior ledge segments of the two or more embossed sections. The machine-readable account identifier links the primary member to an account or record and is secured to the primary member.

24 Claims, 13 Drawing Sheets

(51) Int. Cl.
| | |
|---|---|
| *B42D 15/00* | (2006.01) |
| *B42D 25/20* | (2014.01) |
| *G06Q 20/12* | (2012.01) |
| *G06Q 20/20* | (2012.01) |
| *G06Q 20/28* | (2012.01) |
| *G07F 7/08* | (2006.01) |
| *G06Q 30/02* | (2012.01) |

(52) U.S. Cl.
CPC .......... *B42D15/0086* (2013.01); *B42D 25/285* (2014.10); *G06Q 20/12* (2013.01); *G06Q 20/20* (2013.01); *G06Q 20/28* (2013.01); *G06Q 20/341* (2013.01); *G06Q 20/346* (2013.01); *G06Q 20/347* (2013.01); *G06Q 20/349* (2013.01); *G06Q 30/0207* (2013.01); *G07F 7/086* (2013.01); *G07F 7/0866* (2013.01); *Y10T 29/49826* (2015.01)

(56) References Cited

U.S. PATENT DOCUMENTS

| | | |
|---|---|---|
| 889,714 A | 6/1908 | McDonald |
| 966,107 A | 8/1910 | Lowe |
| 970,531 A | 9/1910 | Morgan |
| 976,495 A | 11/1910 | Reeves |
| 1,041,573 A | 10/1912 | Baring-Gould |
| 1,044,377 A | 11/1912 | Gray |
| 1,376,167 A | 4/1921 | Schrepfer |
| 1,419,136 A | 6/1922 | Hauck |
| 1,546,928 A | 7/1925 | Graham |
| 1,598,497 A | 8/1926 | Oswald |
| 1,617,687 A | 2/1927 | Munson |
| 1,618,710 A | 2/1927 | Hose |
| 1,951,022 A | 3/1934 | Iverson |
| 1,961,973 A | 6/1934 | Jenkins |
| 2,289,977 A | 7/1942 | Maibaum |
| 2,305,195 A | 12/1942 | Richter |
| 2,476,742 A | 7/1949 | Lareau et al. |
| 2,554,098 A | 5/1951 | Eisner |
| 2,573,625 A | 10/1951 | Swart |
| 2,728,167 A | 12/1955 | Knott |
| 2,732,655 A | 1/1956 | Dirckx |
| 2,787,852 A | 4/1957 | Youngren |
| 2,815,605 A | 12/1957 | Connell |
| 2,834,123 A | 5/1958 | Knight |
| 2,931,657 A | 4/1960 | Lewis |
| 3,427,642 A | 2/1969 | Mohr |
| 3,434,414 A | 3/1969 | Wright |
| 3,710,508 A | 1/1973 | McLaren |
| 3,717,942 A | 2/1973 | Presby |
| 4,054,242 A | 10/1977 | Strobe |
| 4,309,839 A | 1/1982 | White et al. |
| 4,341,035 A | 7/1982 | Jaworski et al. |
| 4,364,195 A | 12/1982 | Kleve |
| 5,777,305 A | 7/1998 | Smith et al. |
| 5,871,237 A | 2/1999 | Hunt |
| 6,061,938 A | 5/2000 | Young |
| 6,146,721 A | 11/2000 | Freynet |
| 6,439,613 B2 | 8/2002 | Klure |
| 6,557,700 B1 | 5/2003 | Wharton |
| 7,024,807 B2 | 4/2006 | Street |
| 7,314,179 B1 | 1/2008 | Halbur et al. |
| 7,445,157 B2 | 11/2008 | Clegg et al. |
| 7,520,425 B2 | 4/2009 | Clegg |
| 7,584,558 B2 | 9/2009 | Boyd et al. |
| 7,628,336 B2 | 12/2009 | Reynolds et al. |
| 7,717,347 B2 * | 5/2010 | Boyd .................. B42D 15/042 206/308.1 |
| 7,766,227 B2 | 8/2010 | Reynolds et al. |
| 7,900,827 B2 | 3/2011 | Albers et al. |
| 7,905,416 B2 * | 3/2011 | Halbur .................. G06Q 30/02 235/380 |
| 7,959,068 B2 | 6/2011 | Halbur et al. |
| 7,980,475 B2 * | 7/2011 | Halbur ................ G06Q 20/349 235/380 |
| 8,016,193 B2 | 9/2011 | Haugen et al. |
| 8,038,067 B2 * | 10/2011 | Albers .................. G06Q 20/10 235/487 |
| 8,091,781 B2 | 1/2012 | Albrecht et al. |
| 8,256,667 B2 | 9/2012 | Poznansky et al. |
| 8,434,680 B1 | 5/2013 | Schultz et al. |
| 8,478,647 B2 | 7/2013 | Albrecht et al. |
| 8,550,463 B2 | 10/2013 | Pompei et al. |
| 2002/0096873 A1 | 7/2002 | Scheinblum |
| 2002/0143697 A1 | 10/2002 | Gotfried |
| 2004/0249748 A1 | 12/2004 | Schultz et al. |
| 2005/0061889 A1 | 3/2005 | McGee et al. |
| 2006/0010734 A1 | 1/2006 | Boydston |
| 2006/0065748 A1 | 3/2006 | Halbur et al. |
| 2006/0209260 A1 | 9/2006 | Clegg |
| 2007/0295820 A1 * | 12/2007 | Halbur ..................... G07F 7/08 235/487 |
| 2009/0112711 A1 | 4/2009 | Clegg et al. |
| 2011/0099863 A1 | 5/2011 | Burtch |
| 2012/0230531 A1 | 9/2012 | Jackson |

FOREIGN PATENT DOCUMENTS

| | | |
|---|---|---|
| WO | 0038999 A1 | 7/2000 |
| WO | 2007007094 A1 | 1/2007 |
| WO | 2007034227 A2 | 3/2007 |
| WO | 2007083151 A1 | 7/2007 |
| WO | 2007083156 A1 | 7/2007 |

OTHER PUBLICATIONS

Wade, Will, "First Data Seeks Sticker Device as Mobile-Pay Bridge," American Banker, Aug. 25, 2008 (2 pages).

"Contactless Payments: Consumer Trends and Usage Preferences," firstdata.com, 2008 (2 pages).

First Data, "Go-Tag Solution," http:/lwww.firstdata.com, 2008, (2 pages).

* cited by examiner

TRANSACTION PRODUCT WITH MOVABLE MEMBER

CROSS-REFERENCE TO RELATED APPLICATION

This application is a non-provisional application of and claims priority under 35 U.S.C. §119(e) to U.S. Provisional Patent Application No. 61/746,749, filed Dec. 28, 2012, which is incorporated herein by reference.

BACKGROUND OF THE INVENTION

Stored-value cards and other transaction cards come in many forms. A gift card, for example, is a type of stored-value card that includes a pre-loaded or selectively loaded monetary value. In one example, a consumer buys a gift card having a specified value for presentation as a gift to another person. In another example, a consumer is offered a gift card as an incentive to make a purchase. A gift card, like other stored-value cards, can be "recharged" or "reloaded" at the direction of the bearer. The balance associated with the gift card declines as the gift card is used, encouraging repeat visits to the retailer or other provider issuing the gift card. Additionally, the gift card generally remains in the user's purse or wallet, serving as an advertisement or reminder to revisit the associated retailer. Gift cards and other transaction cards provide a number of advantages to both the consumer and the retailer.

SUMMARY

One aspect of the present invention relates to a transaction product comprising a primary member, an auxiliary member, and a machine-readable account identifier. The primary member defines a first panel and a second panel, wherein the first panel and the second panel are each substantially planar, the first panel defines two or more embossed sections defining interior ledge segments facing one another to define a track therebetween, and the first panel and the second panel are coupled to one another such that the track is interposed between the first panel and the second panel. The auxiliary member is interposed between the first panel and the second panel, is at least partially positioned within the track, and is configured to move within the track in one or more of a first direction and a second direction relative to the primary member. Movement of the auxiliary member is limited in each of the one or more of the first direction and the second direction by interaction between the auxiliary member and the interior ledge segments of the two or more embossed sections. The machine-readable account identifier links the primary member to an account or record and is secured to the primary member. Other related products and methods are also disclosed and provide additional advantages.

BRIEF DESCRIPTION OF THE DRAWINGS

Embodiments of the invention will be described with respect to the figures, in which like reference numerals denote like elements, and in which.

DETAILED DESCRIPTION

Figure 1:
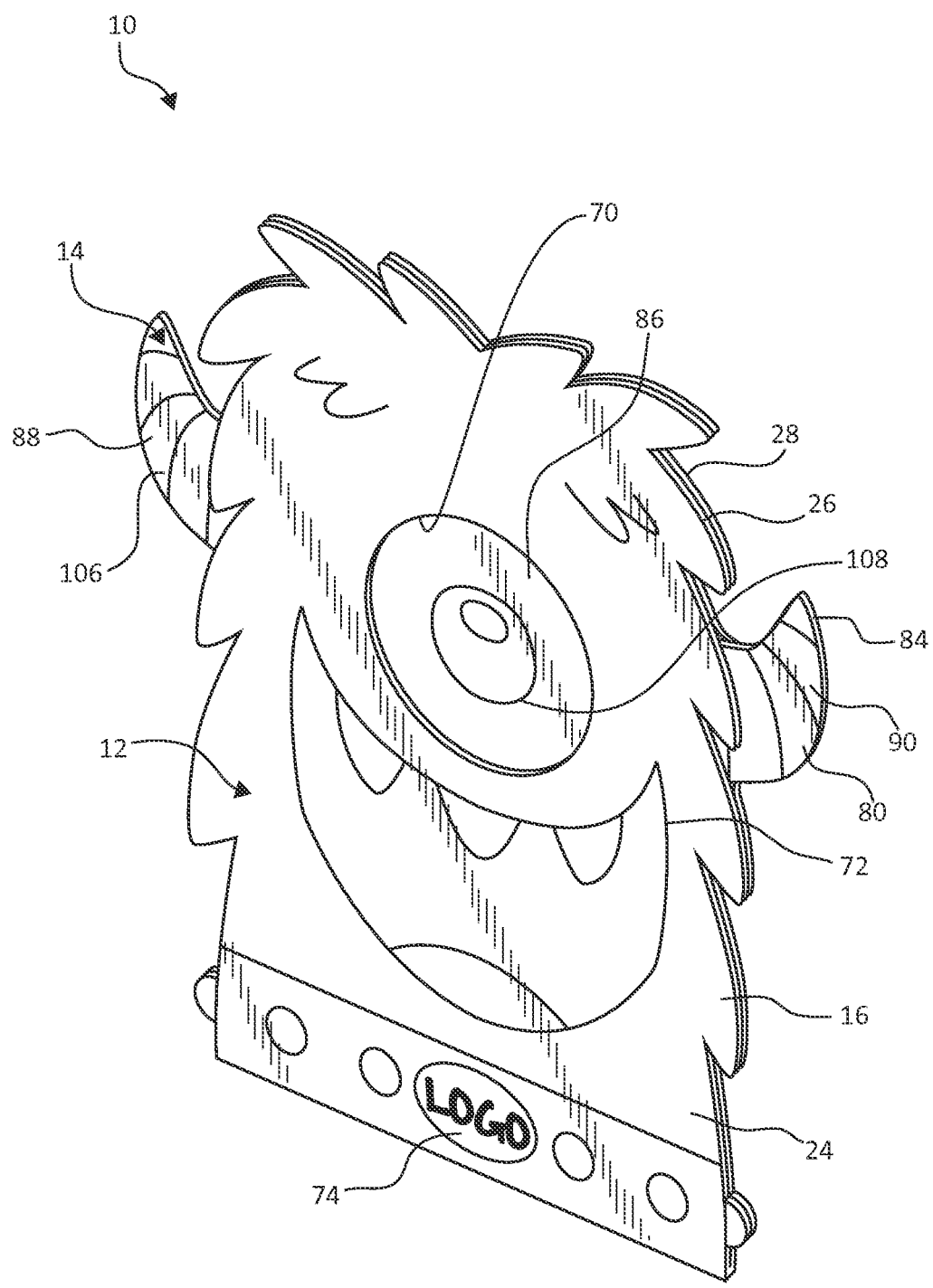
FIG. 1 is a front, perspective view illustration of a transaction product in a first position, according to one embodiment of the present invention.

A gift card or other transaction product is adapted for making purchases of goods and/or services from e.g., a retail store or website. According to one embodiment, an original consumer buys the transaction product to give a recipient who in turn is able to use the transaction product at a retail store or setting to pay for goods and/or services. The transaction product, according to embodiments of the present invention, provides the consumer and recipient with extra functionality in addition to the ability to pay for goods and/or services with the transaction product. In particular, the transaction product presents the original consumer and/or other bearer of the transaction product with an amusing and variable visual presentation in the form of a movable auxiliary member.

Referring to the figures, FIGS. 1-10 illustrate one example of a transaction product 10 or other interactive product including a primary member 12 and an auxiliary member 14.

Primary member 12 includes a front panel 16 and a back panel 18 (i.e., first and second panels) joined to one another along a fold line 20 or separately formed from one another. In one embodiment, front panel 16 and back panel 18 are substantially identical in size and shape and each define an interior surface 22 opposite an exterior surface 24, for instance, where the primary member 12 is a substantially planar member. Where front panel 16 and back panel 18 have substantially identical sizes and shapes, front panel 16 and back panel 18 define a perimeter edge 26 and a perimeter edge 28, respectively, that are substantially identical to each other. In one example, back panel 18 is sized and/or shaped differently than front panel 16 such that perimeter edges 26 and 28 are also differently sized and/or shaped as compared to each other.

Figure 8:
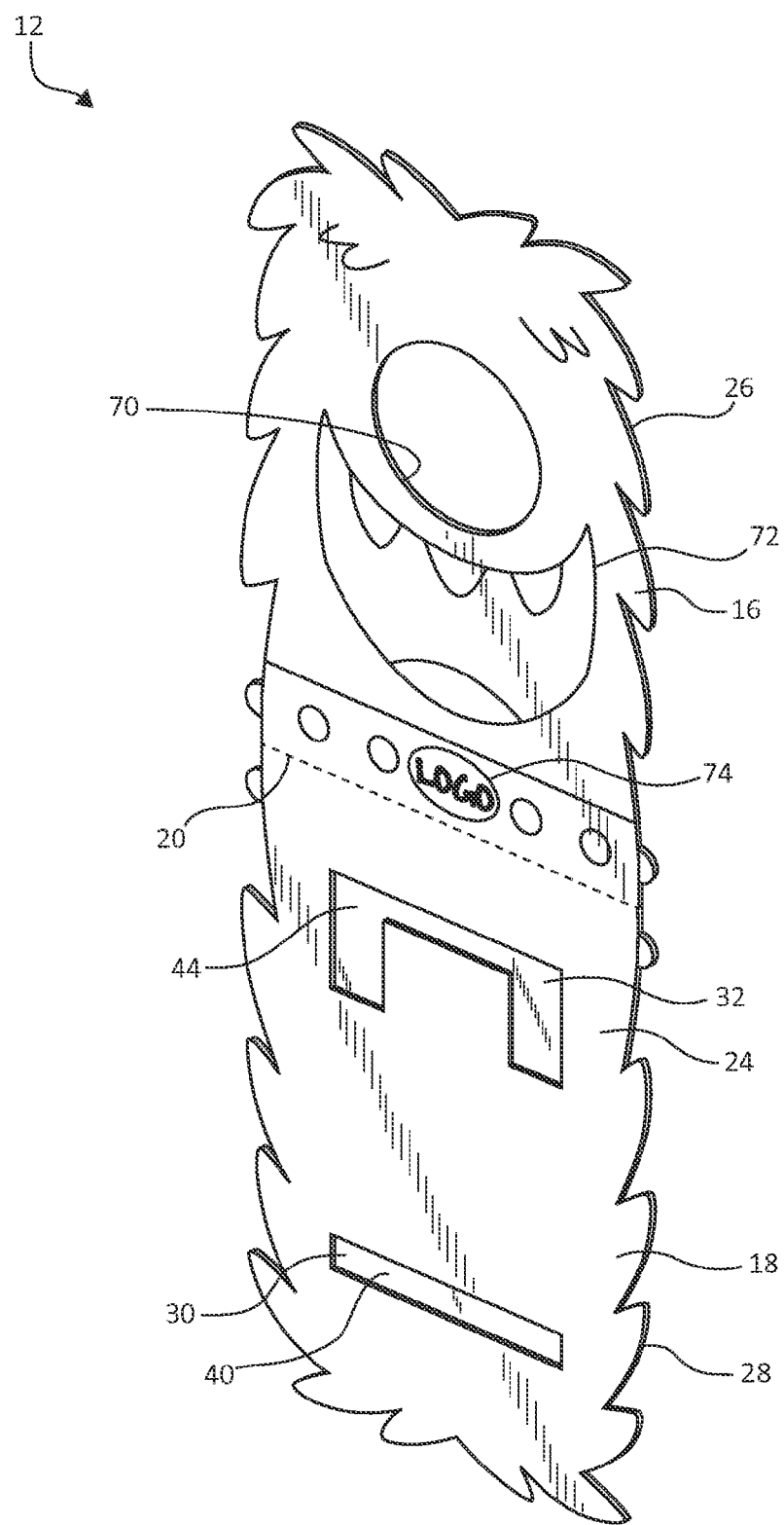
FIG. 8 is a rear, perspective view illustration of the unfolded primary member of FIG. 7, according to one embodiment of the present invention.
Figure 11:
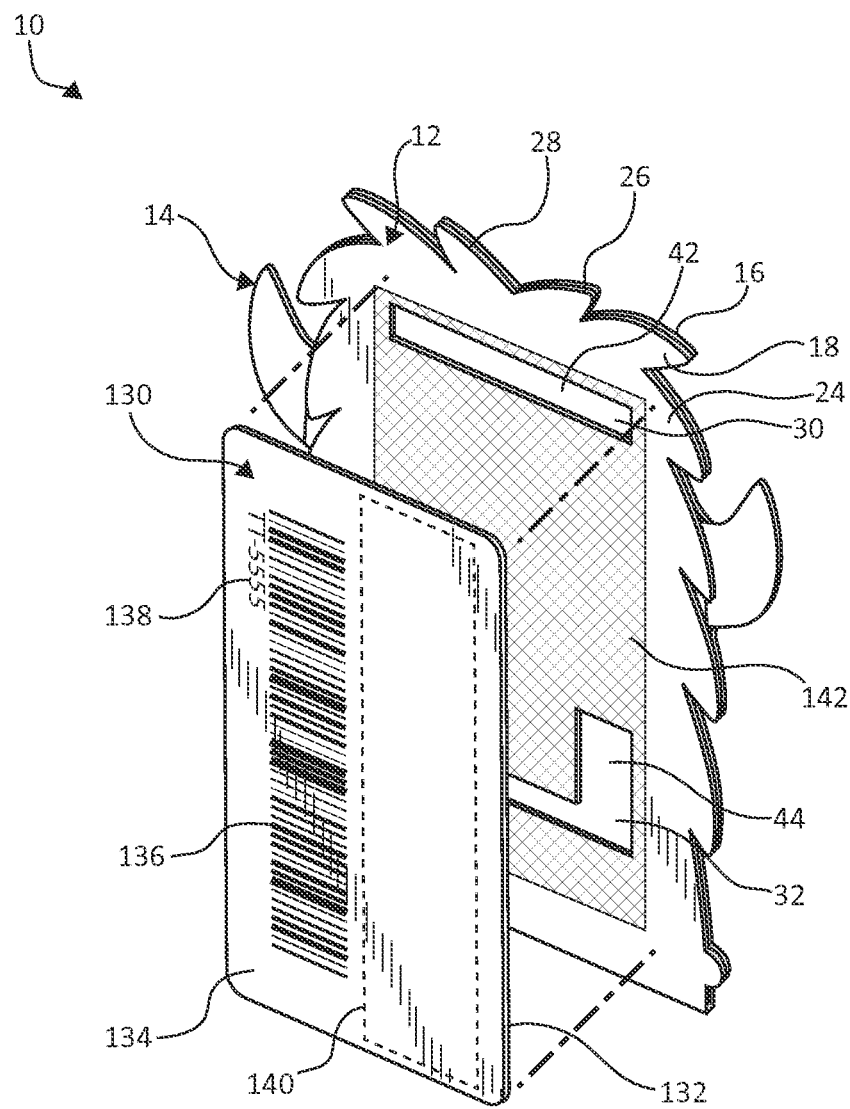
FIG. 11 is a partially exploded rear, perspective view illustration of the primary member and the auxiliary member assembled and a coded member of the transaction product of FIG. 1, according to one embodiment of the present invention.

Interior surface 22 defined by one of front panel 16 and back panel 18, e.g., back panel 18 as illustrated in FIGS. 7-11 and described throughout the remainder of this application, includes a first embossed section 30 (otherwise referred to as a first relief feature) and a second embossed section 32 (otherwise referred to as a second relief feature) spaced from first embossed section 30. Continuing to refer to FIGS. 7-11, each of first and second embossed sections 30 and 32 include one of an offset interior surface 34 and 36, respectively, which are each inwardly offset (e.g., forwardly offset in the illustrations) from and extend beyond interior surface 22 of a remainder of back panel 18, and a first ledge 38 and a second ledge 40 (otherwise referred to as first and second interior ledges), respectively, extending between interior surface 22 and a corresponding one of offset interior surface 34 and 36. In one example, each of first and second ledges 38 and 40 extends substantially perpendicularly relative to each of one of offset interior surfaces 34 and 36 and interior surface 22 of the remainder of back panel 18. In one embodiment, first embossed section 30 and second embossed section 32 are formed to define ledges 28 and 40 with a thickness (i.e., a dimension between interior surface 22 and a corresponding offset interior surfaces 34 and 36) that is slightly greater than a thickness of auxiliary member 14. In one example, first embossed section 30 and second embossed section 32 also define corresponding first and second indentations 42 and 44 in exterior surface 24 of back panel 18 as illustrated in FIGS. 8 and 11.

In one embodiment, first ledge 38 is substantially rectangular defining a first ledge segment 50 that is substantially linear and faces toward second ledge 40. In one embodiment, second ledge 40 includes a second ledge segment 52 that is substantially linear, either continuous or discontinuous, and faces toward first ledge 38 running in parallel with first ledge segment 50. First ledge segment 50 and second ledge segment 52 each form opposing boundaries of an open-ended recessed area or track 54 (e.g., a primary track), for example, a substantially linear track 54. Track 54 is configured to guide movement of auxiliary member 14 relative to primary member 12 in a first direction as will be further described below.

Second embossed section 32 is substantially u-shaped or otherwise formed such that second ledge 40 defines an offset ledge segment 56 and/or one or two stop ledge segments 58 on either end of offset ledge segment 56 extending to a different portion of second ledge segment 52, according to the illustrated embodiment. Each stop ledge segment 58 faces toward the other stop ledge segment 58 where two stop ledge segments 58 are included. In one example, each stop ledge segment 58 extends away from second ledge segment 52, for instance, substantially perpendicularly relative to second ledge segment 52 to offset ledge segment 56. Stop ledge segments 58 define opposing boundaries to a second recessed area that is considered a secondary or movement-limiting track 60. In one example (not illustrated), second embossed section 32 is in the form of two distinct sections spaced from one another in a manner eliminating offset ledge segment 56. Movement-limiting track 60 is configured to limit movement of auxiliary member 14 in the second direction relative to primary member 12. In one example, the first direction is substantially perpendicular to the second direction.

In one example, front panel 16, or alternatively or additionally back panel 18, of primary member 12 defines a window 70 or other opening, for example, in a location that will align with the recessed area of primary track 54 upon assembly. Window 70 has a desired shape and size corresponding with a reveal portion of the auxiliary member 14 as will be further described below. In one example, primary member 12 is continuous and forms no window 70 or other aperture. Primary member 12 includes indicia 72 such as decorative indicia presenting a character, scene, object, or similar presentation, for example, corresponding with an overall shape of front panel 16. In one embodiment, an overall shape of front panel 16 and indicia 72 collectively present a general appearance of a monster as illustrated in FIGS. 1-9. In one example, primary member 12 additionally or alternatively includes brand indicia 74 identifying a brand associated with transaction product 10 such as identifying a product brand, a store brand, a department, etc. Other indicia may also be included on primary member 12 as will be apparent to those of skill in the art.

Auxiliary member 14 is substantially planar defining a front surface 80 and a back surface 82 opposite front surface 80, in one embodiment, for example, as illustrated in FIGS. 1-7, 10, and 11. Auxiliary member 14 defines a thickness between front surface 80 and back surface 82 that is substantially similar to or slightly smaller than a thickness of each ledges 38 and 40 defined by primary member 12. Auxiliary member 14 defines a perimeter edge 84 having a shape corresponding with a portion of the character, scene, object, or similar presentation presented by primary member 12. For example, in the illustrated embodiments, auxiliary member 14 presents an appendage, horn, or other extension member of the monster character presented by primary member 12. Auxiliary member 14 has an overall dimension in one direction that is greater than a corresponding dimension of primary member 12. For example, referring to FIG. 2, in one example, auxiliary member 14 has an overall width $W_A$ that is greater than an overall width $W_P$ of primary member 12 or at least of a portion of primary member 12 corresponding with an eventual location of auxiliary member 14.

In one example, auxiliary member 14 defines a middle or intermediate section 86, a first end section 88, a second end section 90, and a stop section or stop tab 92. More specifically, intermediate section 86 includes opposing side boundaries 94, and each of first end section 88 and second end section 90 extends from opposite ones of opposing side boundaries 94 away from intermediate section 86 to a first side free edge 96 and a second side free edge 98, respectively. In one example, intermediate section has a larger overall height or other dimension than either first end section 88 or second end section 90. Overall width $W_A$ (FIG. 2) of auxiliary member 14 is defined between opposite points of first side free edge 96 and second side free edge 98, in one example. A third boundary 100 of intermediate section 86 extends from and between each of opposing side boundaries 94 and 96, for example, along a bottom or other edge thereof, and a fourth boundary 101 of intermediate section 86 is formed as an outermost edge of intermediate section 86 extending between opposite side boundaries 94 and 96 opposite third boundary 100. In one example, each of third boundary 100 and fourth boundary 101 define continuous or non-continuous, substantially linear edges extending substantially parallel to one another.

Stop section 92 depends or otherwise extends away from third boundary 100 of intermediate section 86. In one example, stop section 92 has a smaller overall width than overall width of intermediate section 86 and defines a free edge 102 opposite third boundary 100 and opposing side edges 104 extending from third boundary 100 to free edge 102.

Auxiliary member 14 includes end indicia 106 on first end section 88 and/or second end section 90 and intermediate indicia 108 on intermediate section 86. In one example, end indicia 106 and intermediate indicia 108 correspond with indicia 72 of primary member 12. More particularly, in one example intermediate indicia 108 presents a portion of the character, scene, etc. of indicia 72 corresponding with a location of window 70 defined by primary member. As shown in the illustrations, in one example, window 70 indicates an eye socket while intermediate indicia 108 of auxiliary member 14 presents an eyeball.

During assembly of transaction product 10, auxiliary member 14 generally is interposed between front panel 16 and back panel 18 of primary member 12 to at least one of extend out beyond perimeter edges 26 and 28 of primary member 12 and be viewable through window 70 formed by primary member 70, according to one embodiment, as illustrated in FIGS. 1-7, 10, and 11. In one example, at least perimeter edge 26 and 28 define an overall shape of front panel 16 of primary member 12 depicting a character, scene, or similar presentation, and auxiliary member 14 is shaped and marked to depict a portion of that character, scene, or similar presentation. As illustrated, primary member 12 presents a monster character with window 70 being positioned at a location representing an eye socket of the monster, and auxiliary member 14 depicts an eyeball via intermediate section 86 and two opposing horns of the monster via first end section 88 and second end section 90. Other depictions, etc. will be apparent to those of skill in the art upon reading this application, e.g., a scene depicted by primary member 12 with a vehicle, animal, etc. depicted by auxiliary member 14.

Figure 9:
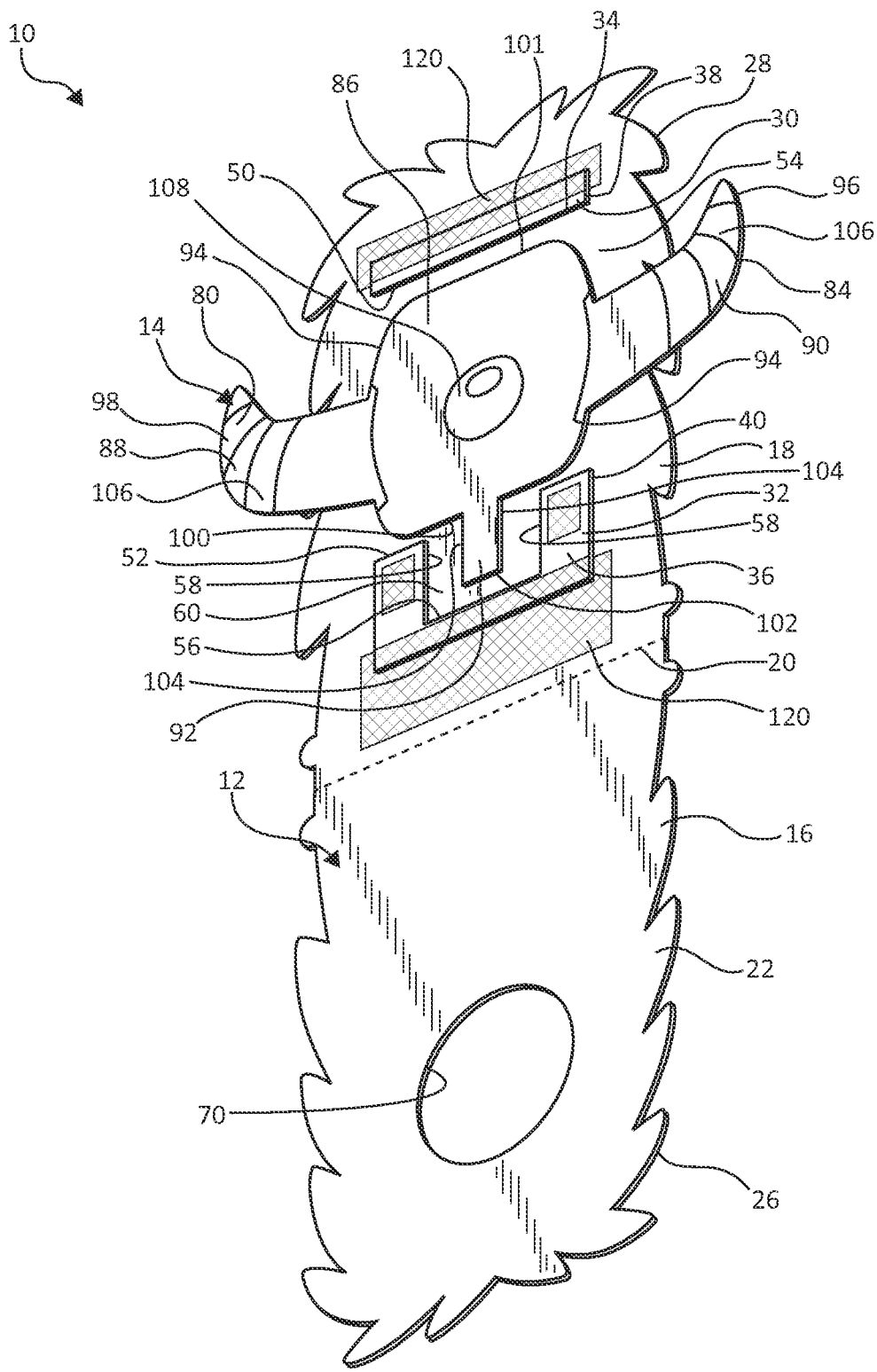
FIG. 9 is a front, perspective view illustration of the unfolded primary member of FIG. 7 with an auxiliary member of FIG. 1, according to one embodiment of the present invention.
Figure 10:
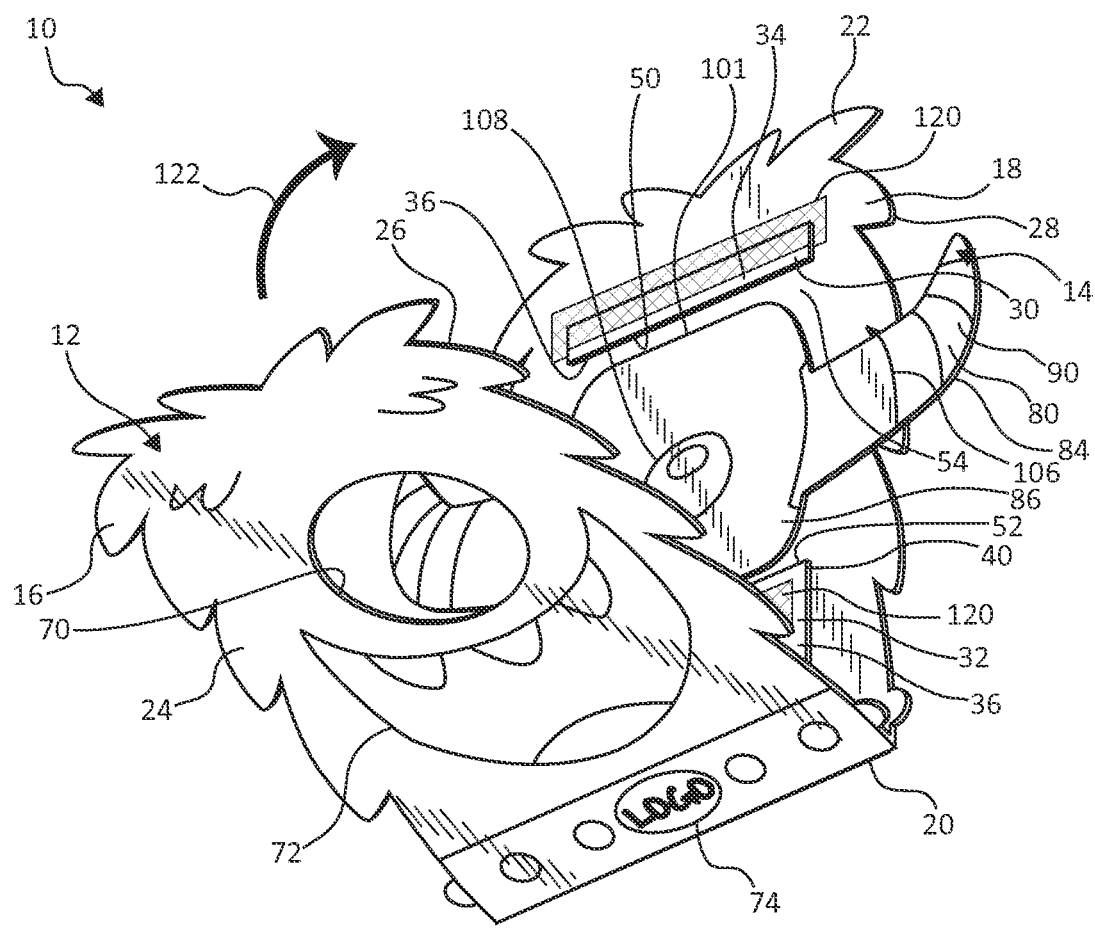
FIG. 10 is a front, perspective view illustration of the primary member and the auxiliary member of FIG. 9 when the primary member is being folded to assemble the transaction product of FIG. 1, according to one embodiment of the present invention.

Referring to FIG. 9, in one example, assembly of transaction product 10 more particularly includes, placing auxiliary member 14 to fit largely within tracks 54 and 60 defined by back panel 18. Auxiliary member 14 is immediately adjacent interior surface 22 of back panel 18 of primary member 12 such that at least intermediate section 86 fits substantially entirely in track 54 that is between first ledge segment 50 and second ledge segment 52. When so positioned, stop section 92 of auxiliary member 14 is positioned in movement-limiting track 60, which is defined between stop ledge segments 58 of second embossed section 32 of primary member 12. More specifically, in one example, auxiliary member 14 is largely placed in track 54 with first ends section 88 and second end section 90 of auxiliary member 14 extending beyond at least one of right and left open ends of track 54 and beyond at least one of right and left portions of perimeter edge 26. Stop section 92 extends downwardly therefrom to be positioned substantially entirely within movement-limiting track 60 where movement-limiting track 60 is laterally larger than stop section 92 to allow movement of the stop section 92 in a second direction between stop ledge segments 58.

Figure 2:
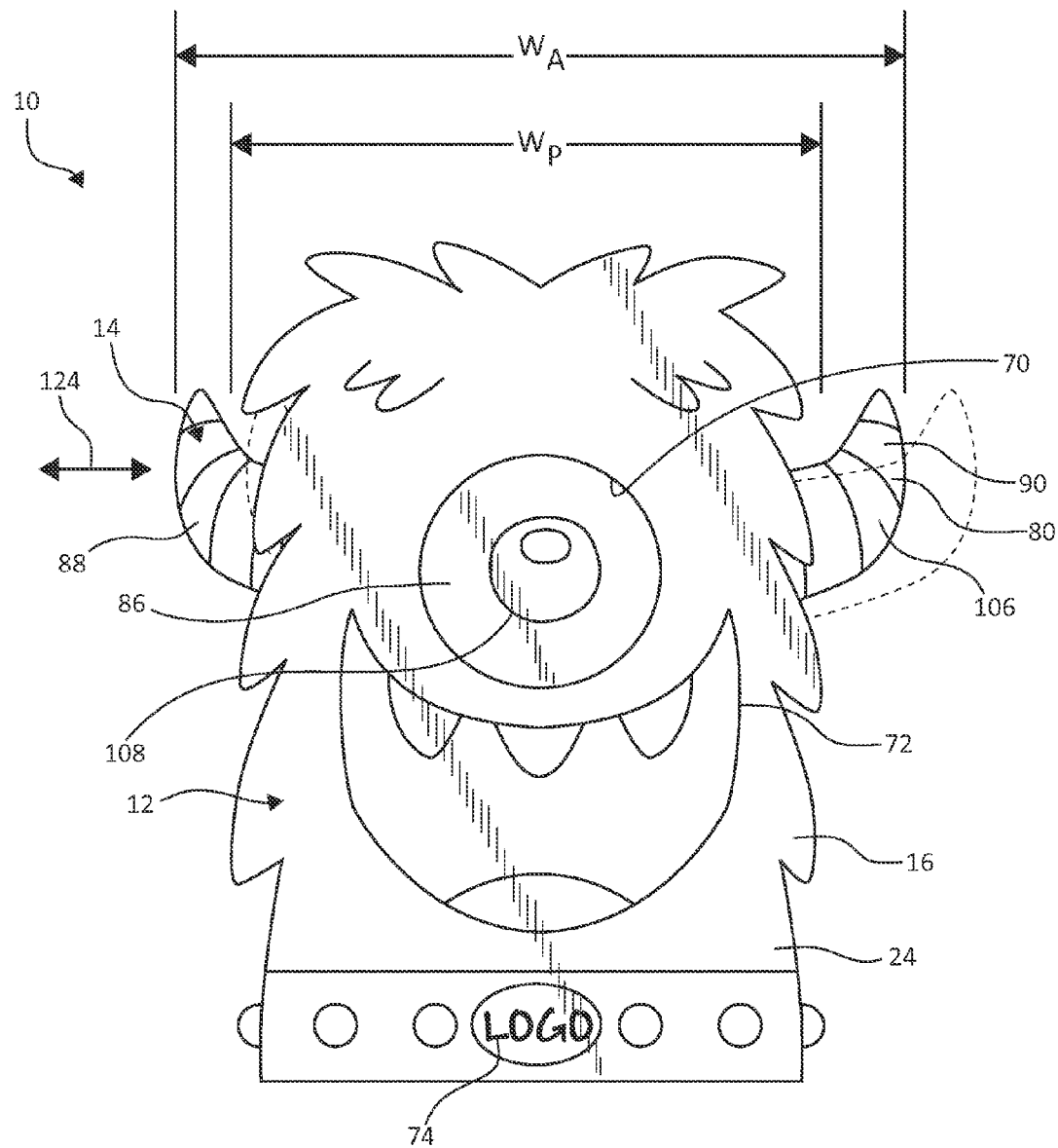
FIG. 2 is a front view illustration of the transaction product of FIG. 1, according to one embodiment of the present invention.
Figure 3:
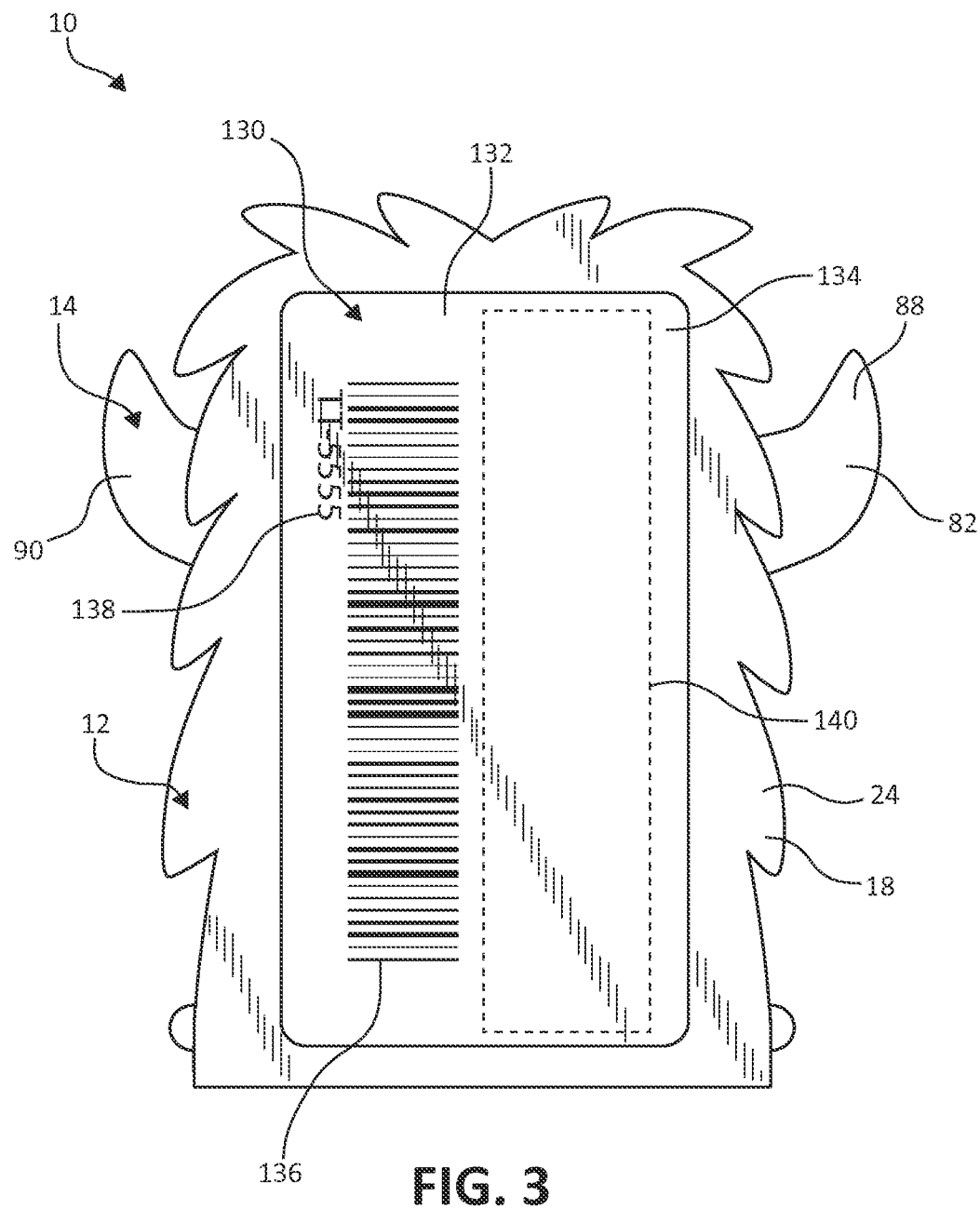
FIG. 3 is a rear view illustration of the transaction product of FIG. 1, according to one embodiment of the present invention.
Figure 4:
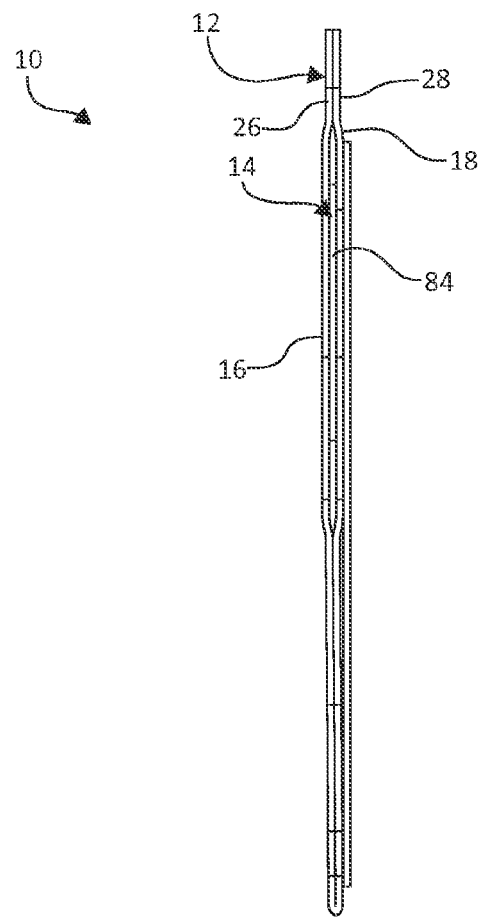
FIG. 4 is a right side view illustration of the transaction product of FIG. 1, according to one embodiment of the present invention; the left side view being a mirror image of the right side view.
Figure 5:
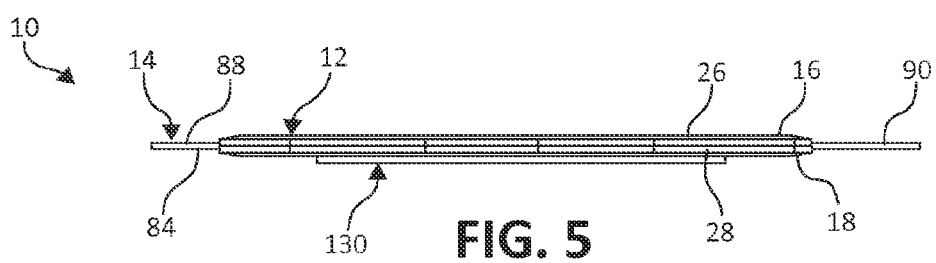
FIG. 5 is a top view illustration of the transaction product of FIG. 1, according to one embodiment of the present invention.
Figure 6:
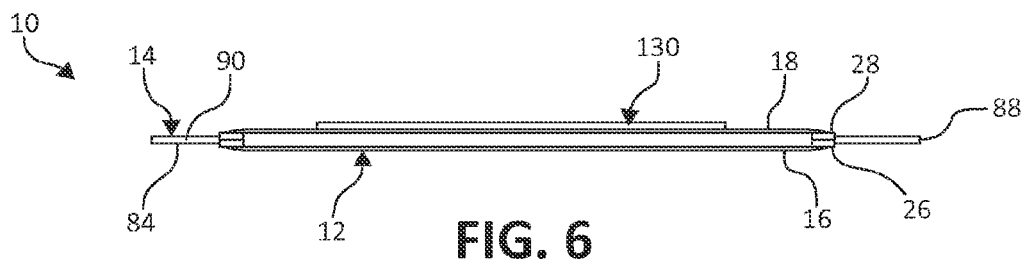
FIG. 6 is a bottom view illustration of the transaction product of FIG. 1, according to one embodiment of the present invention.
Figure 7:
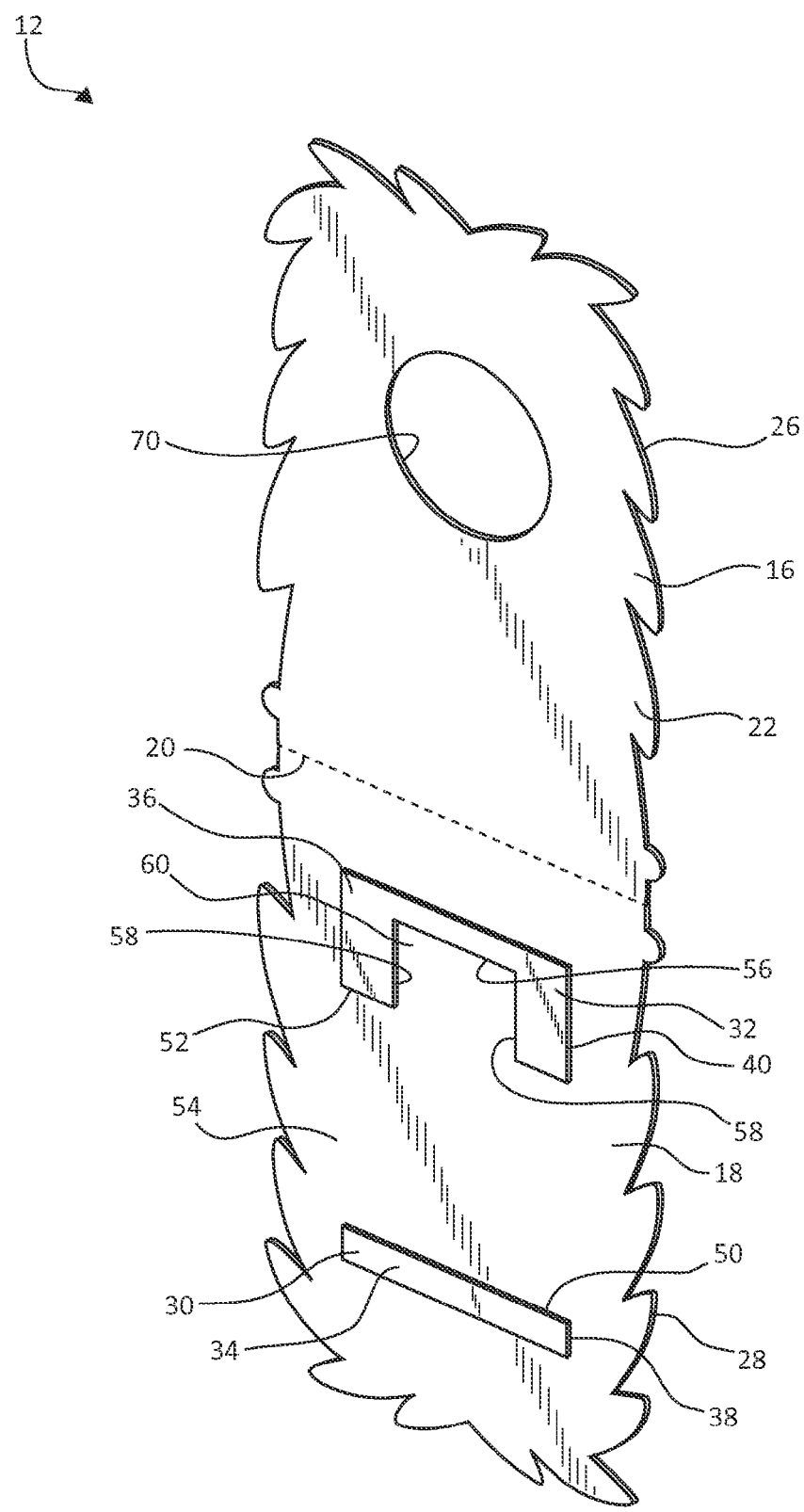
FIG. 7 is a front, perspective view illustration of an unfolded primary member of the transaction product of FIG. 1, according to one embodiment of the present invention.

In the above-described position, track 54 guides lateral sliding movement of auxiliary member 14, as illustrated by arrow 124 in FIG. 2, for example, initiated by a user interacting with one of first end section 88 and second end section 90 as a handle. Track 54 generally limits longitudinal movement (e.g., up and down movement) while allowing lateral movement (e.g., side to side movement) of auxiliary member 14 relative to primary member 12. Movement-limiting track 60 prevents or at least decreases inadvertent removal of auxiliary member 14 from primary member 12, which may be caused by pulling auxiliary member 14 too far in either lateral direction, via interaction between side edges 104 of stop section 92 and stop ledge segments 58. While primarily described as up and down or longitudinal and side to side or lateral movement of auxiliary member 14, these directions are described with respect to the illustrated embodiments. In other embodiments, movement of auxiliary member 14 may be allowed or restrained in a different two directions based on the orientation and placement of first and second embossed sections 30 and 32 as will be apparent to those of skill in the art upon reading this application. In view of the above, back panel 18 is one example of means for substantially covering a surface of auxiliary member 14, and first and second embossed sections 30 and 32 defining means for limiting movement of auxiliary member 14 in a first direction and a second direction in the form of first and second ledges 38 and 40 and tracks 54 and 60 defined by first and second ledges 38 and 40.

Once auxiliary member 14 is placed in the desired position relative to back panel 18 of primary member 12, front panel 16 is coupled with back panel 18 interposing auxiliary member 14 therebetween, for example, by folding primary member 12 about fold line 20 so that perimeter edges 26 and 28 are substantially coextensive. In other embodiments, front panel 16 and back panel 18 may have differently shaped or sized perimeter edges 26 and 28. In one example, prior to positioning front panel 16 over back panel 18, adhesive 120, which is generally indicated in the figures with cross-hatching, is applied to back panel 18 to extend over interior surface 22 of back panel 18 and offset interior surfaces 34 and 36 of first and second embossed sections 30 and 32. Notably, in one example, no adhesive 120 is applied to portions of interior surface 22 defined by back panel 18 in tracks 54 and 60 or in any longitudinal position aligning with track 54. By keeping tracks 54 and 60 free of adhesive, movement of auxiliary member 14 generally is not impeded by adhesive. In this manner, when front panel 16 is placed on back panel 18, it is adhered thereto such that portions of interior surface 22 defined by front panel 16 directly abut portions of interior surface defined by back panel 18, especially on top and bottom sides of tracks 54 and 60 opposites one another, but not within tracks 54 and 60. Coupling front panel 16 to back panel 18 substantially encloses movement-limiting track 60 and substantially encloses track 54 other than open lateral ends of track 54. In view of the above adhesive 120 is one example of means for coupling front panel 16 to back panel 18.

Once front panel 16 is assembled and adhered to the back panel 18, auxiliary member 14 is able to translate or slide laterally or longitudinally relative to primary member 12 in a plane substantially parallel to the non-embossed portions of back panel 18 of primary member 12. For example, auxiliary member 14 moves as generally indicated by arrow 124 between an initial position and the alternative position illustrated in dashed lines in FIG. 2. Such movement in the lateral and longitudinal (e.g., first and second) directions is limited substantially only by interaction between auxiliary member 14 and first and second ledges 38 and 40 of back panel 18. More specifically, longitudinal movement (i.e., movement in the first direction extending up and down in FIG. 2) of auxiliary member 14 is limited by interaction between third and fourth edges 100 and 101 of auxiliary member 14 and first and second ledge segments 50 and 52 of back panel 18. Lateral movement (i.e., movement in the second direction extending right to left in FIG. 2) is limited by interaction between side edges 104 of stop section 92 of auxiliary member 14 and stop ledge segments 58 of back panel 18. Front to back movement of auxiliary member 14 is limited by auxiliary member 14 interaction with facing portions of interior surface 22 as defined by each of front panel 16 and rear panel 18 of primary member 12. In view of the above, front panel 16 is one example of means for substantially covering a surface of auxiliary member 14 opposite back panel 18.

In one example, upon assembly, intermediate section 86, more particularly, intermediate indicia 108 on intermediate section 86, of auxiliary member 14 align with window 70 of primary member 12 while at least one of first end section 88 and second end section 90 extend beyond lateral portions of perimeter edge 26 of front panel 16 of primary member 12. As such, intermediate indicia 108 are viewable through window 70. A user is able to grasp one or both of first end section 88 and second end section 90 to move auxiliary member 14 in a lateral direction and/or in a longitudinal direction to move the position and therefore, overall appearance of intermediate indicia 108 through window 70 as well as the position of first and second end sections 88 and 90 relative to front panel 16 of primary member 12 in an amusing manner appearing to animate the character, scene, or similar overall presentation of transaction product 10.

Referring to FIG. 11, in one example, a cover, finishing card and/or other coded member 130 is applied to a portion of external surface 24 defined by back panel 18 of primary member 12 using adhesive 142 or other suitable coupling agent. The coded member 130 covers the otherwise exposed first and second indentations 42 and 44 formed by first and second embossed sections 30 and 32 in exterior surface 24 of back panel 18. In one embodiment, coded member 130 is substantially planar and defines an interior surface 132, generally indicated in FIG. 11, and an exterior surface 134 opposite interior surface 132. Interior surface 132 faces, is placed adjacent to, and adhered or otherwise coupled to back panel 18. In view of the above, coded member 130 is one example of means for substantially covering external surface 24 of back panel 18.

In one example, exterior surface 134 of coded member 130 includes an account identifier 136 linking transaction product 10 to a remote or local account and/or record of the monetary or other value balance associated with transaction product 10 by providing identification of the associated account and/or record in a manner configured to be machine-readable by a point-of-sale terminal. In one example, account identifier 136 includes one or more of a bar code, magnetic strip, a smart chip or other electronic device, a radio frequency identification (RFID) device or other suitable identifier readily machine readable by a point-of-sale terminal or other account access station or kiosk. The account or record of the monetary or other balance of the transaction product optionally is maintained on a database, other electronic or manual record-keeping system or, in the case of "smart" cards for example, on a chip or other electronic device(s) on transaction product 10 itself. Accordingly, by scanning account identifier 136, the account or record linked to transaction product 10 is identified and can subsequently be activated, have amounts debited therefrom and/or have amounts added thereto.

In one embodiment, account identifier 136 includes a character string or code 138 (e.g., a number and/or letter string) configured to provide additional security to the user of transaction product 10 and/or configured to be read by a bearer of transaction product 10 to facilitate use of transaction product 10 for web site or other purchases outside of brick-and-mortar type retail establishments. With the above in mind, account identifier 136 is one example of means for linking transaction product 10 with an account or record, and scanning of account identifier 136 is one example of means for activating or loading value on transaction product 10. While primarily described as being included on coded member 130, in other embodiments, account identifier 136 is otherwise located on transaction product 10, for example, printed directly to primary member 12 or auxiliary member 14. In one embodiment, coded member 130 is eliminated.

Figure 12:
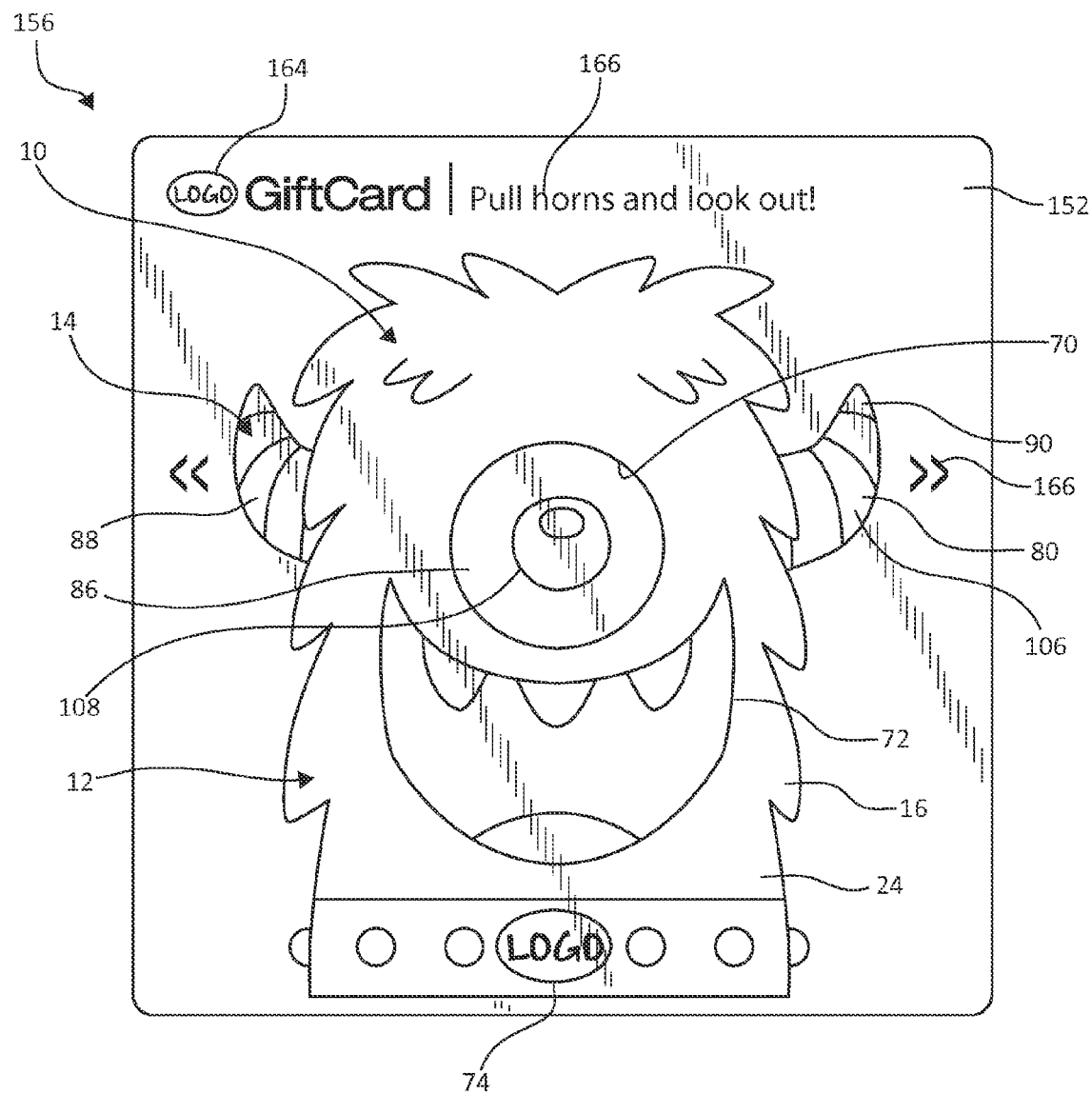
FIG. 12 is a front view illustration of the transaction product of FIG. 1 on a supporting backer, according to one embodiment of the present invention.
Figure 13:
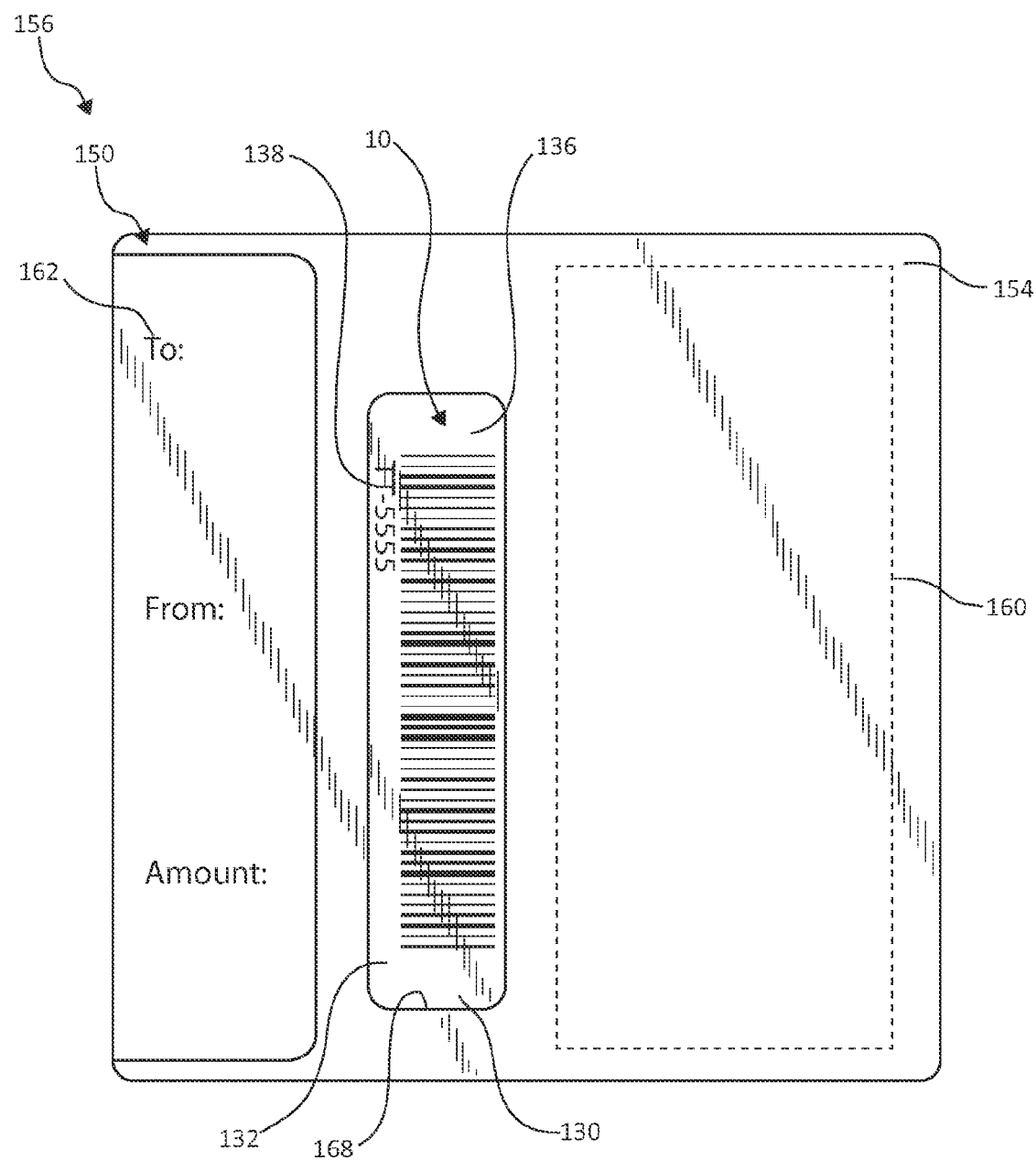
FIG. 13 is a rear view illustration of the transaction product and supporting backer of FIG. 12, according to one embodiment of the present invention.

Referring to FIGS. 12 and 13, in one example, a carrier or backer 150 is coupled to rearmost surfaces of transaction product 10, for instance, exterior surface 134 of coded member 130 and supports transaction product 10 for retail display and/or gift presentation in the form of a transaction product assembly 156. In one example, backer 150 is generally planar and displays indicia, graphics or text information including store logo(s), store name(s), slogans, advertising, instructions, directions, brand indicia, promotional information, seasonal indicia, media format identifiers, characters and/or other information. The various indicia may be included on one or more of a front surface 152 (e.g., as illustrated in FIG. 12) and an opposing rear surface 154 (e.g., as illustrated in FIG. 13) of a substantially planar backer 150.

In one embodiment, backer 150 defines a window or opening 168 for displaying account identifier 136 of transaction product 10 as illustrated in FIG. 13. Accordingly, in one embodiment, window 168 in backer 150 allows access to account identifier 136 to activate and/or load transaction product 10 without removing transaction product 10 from backer 150. In one embodiment, where window 168 of backer 150 is eliminated, backer 150 is foldable or otherwise configured to provide access to account identifier 136 of transaction product 10 without removing transaction product 10 from backer 150.

In one example, backer 150 displays indicia, graphics or text information including store logo(s), store name(s), slogans, advertising, instructions, directions, brand indicia, promotional information, holiday indicia, seasonal indicia, media format identifiers, characters and/or other information. The various indicia may be included on one or more of front surface 152 and rear surface 154. In one example, the indicia include one or more of redemption indicia 160, message field indicia 162, brand indicia 164, instructional indicia 166, etc.

Redemption indicia 160, which are generally indicated with a dashed line box in FIG. 13, inform a bearer of transaction product assembly 156 that transaction product 10 is redeemable for the purchase or use of goods and/or services and that upon use, a value of the purchased goods and/or services will be deducted from the financial account or record linked to transaction product 10. In one embodiment, redemption indicia 160 include phrases such as "<NAME OF STORE> GiftCard" and "This GiftCard is redeemable for merchandise or services at any of our stores or at our website," and/or provides help or phone line information in case of a lost, stolen or damaged transaction product 10, etc.

Message field indicia 162, for example, include one or more "to," "from," "amount" and "message" fields, and are configured to be written to by the bearer of transaction product assembly 156 prior to presenting transaction product assembly 156 to a recipient. As such, message field indicia 162 facilitate the consumer in preparing transaction product assembly 156 for presentation to a recipient. Brand indicia 164 identify a store, brand, department, etc. and/or services associated with transaction product 10. Any other indicia such as decorative indicia may also be included on backer 150.

Instructional indicia 166 provides directions to a potential consumer or other bearer of transaction product assembly 156 touting how to interact with the non-transactional and amusing features of transaction product 10. For example, instructional indicia 166 provide an indication that first and/or second end sections 88 and/or 90 can be grasped and pushed or pulled in an indicated direction to cause movement of auxiliary member 14 to animate the overall character, scene, object, etc. collectively presented by primary member 12 and auxiliary member 14, for example, as indicated in FIG. 12.

Any of indicia 160, 162, 164, 166 or other indicia optionally may appear anywhere on backer 150 or transaction product 10. Additional information besides that specifically described and illustrated herein may also be included. Other backers having various sizes and shapes, such as other foldable and non-foldable backers, can be used with various sizes and shapes of transaction products 10.

Figure 14:
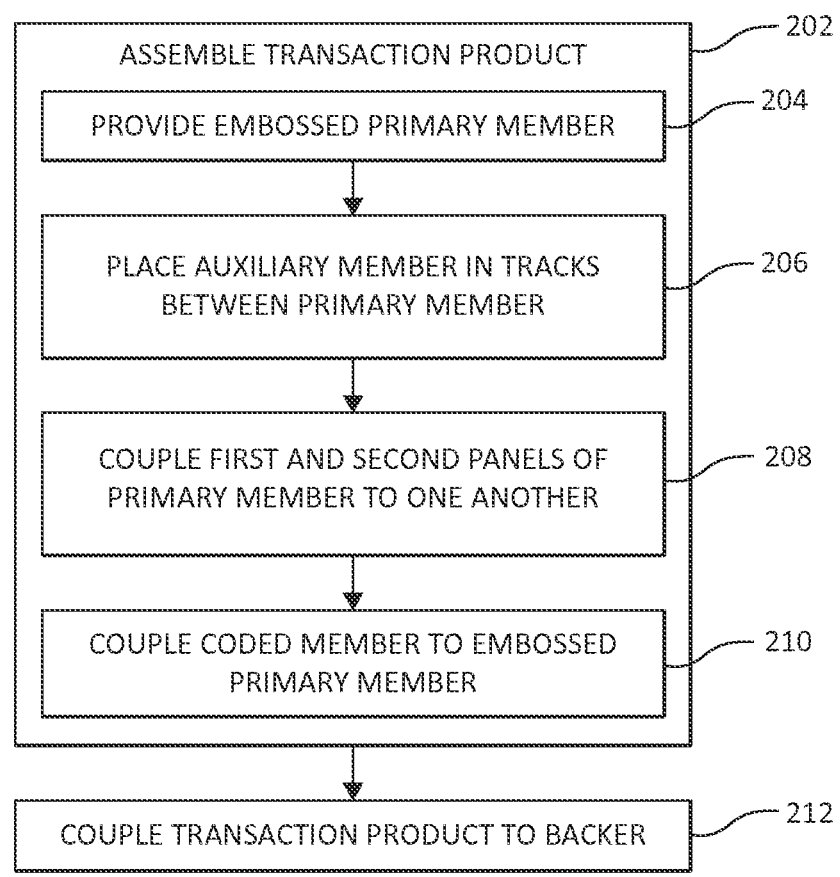
FIG. 14 is a flow chart illustrating a method of assembling a transaction product, according to one embodiment of the present invention.

FIG. 14 is a flow chart illustrating one embodiment of a method 200 of assembling transaction product assembly 156. Additionally referring to FIGS. 9-11, in one example, at 202, transaction product 10 is assembled and at 212, assembled transaction product 10 is coupled to backer 150 to form transaction product assembly 156. According to one embodiment, assembling transaction product 10 at 204 includes providing embossed primary member 12. In one example, providing embossed primary member 12 includes using an embossing machine to form first and second embossed sections 30 and 32 of primary member having offset interior surfaces 34 and 36 and corresponding external indentations 42 and 44. At 206, auxiliary member 14 is placed partially within tracks 54 and 60 defined by embossed sections 30 and 32 of primary member 12, for instance, back panel 18, according to one example. Partial placement of auxiliary member 14 in tracks 54 and 60 is configured to allow for primary movement of auxiliary member 14 in a first direction relative to primary member 12 within track 54 as limited by auxiliary member 14 interaction with track 60.

Once auxiliary member 14 is placed in tracks 54 and 60, front panel 16 and back panel 18 are coupled to one another interposing auxiliary member 14 therebetween while still permitting movement of auxiliary member 14 relative to primary member 12 at 208. In one example, front panel 16 is folded over rear panel 18 and adhered or otherwise coupled thereto such that perimeter edges 26 and 26 are placed to be substantially coextensive with one another other than where auxiliary member 14 passes therebetween.

Coded member 130 is optionally coupled to back panel 18 of primary member 12 at 210 to cover first and second indentations 42 and 44 and provide account identifier 136 to transaction product 10. In other embodiments, coded member 130 and operation 210 are eliminated and account identifier 136 and/or other indicia are directly printed to or provided by back panel 18 or other portion of primary member 12.

At 320, transaction product 10 is coupled with backer 250 as generally illustrated with reference to FIGS. 12 and 13 to form transaction product assembly 156. Transaction product 10 may be adhered, skinned to, blister packed with or otherwise suitably coupled with backer 150. In one embodiment, account identifier 136 of transaction product 10 is accessible for scanning while transaction product 10 is coupled with backer 150, for example, through window 168 in backer 150.

Figure 15:
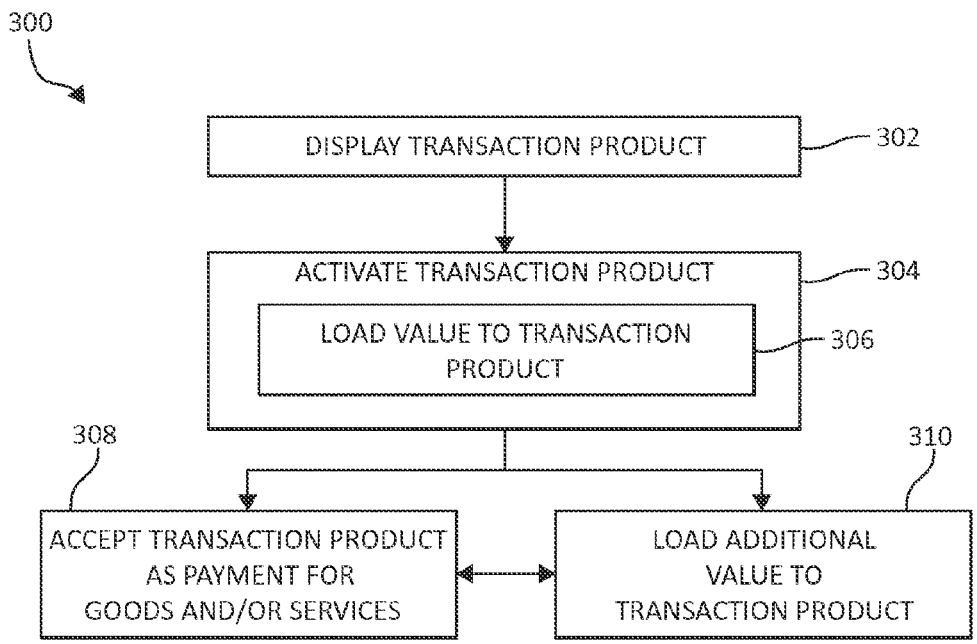
FIG. 15 is a flow chart illustrating a method of encouraging purchase and facilitating use of a transaction product, according to one embodiment of the present invention.

FIG. 15 is a flow chart illustrating one embodiment of a method 300 of encouraging purchase and facilitating use of transaction product 10 by consumers and/or recipients. At 302, transaction product 10 is placed on or hung from a rack, shelf or other similar device to display transaction product 10 for sale to potential consumers. In one embodiment, a depiction of transaction product 10 is placed on a web site for viewing and purchase by potential consumers.

At 304, a consumer who has decided to purchase transaction product 10 presents transaction product 10 with or without backer 150 to a retail store employee, retail store kiosk, remote terminal or other person or device to scan account identifier 136 to access an account or record linked to account identifier 136. In particular, account identifier 136 is scanned or otherwise accessed, for example through window 168 of backer 150 to activate transaction product 10. Upon accessing the account or record, then, at 306, value is added to the account or record in the form of monetary value, points, minutes, etc. Thus, transaction product 10 is activated and loaded.

In one example, a predetermined value is associated with transaction product 10 (i.e., associated with the account or record linked to transaction product 10 via account identifier 136) prior to activation and display, but such predetermined value is not initially available for use toward the purchase or use of goods and/or services. In such an embodiment, at 304, transaction product 10 is activated to permit subsequent access to the predetermined value (e.g., subsequent loading on and debiting from the account or record) and no additional value is added during activation such that operation 306 may be eliminated.

Once transaction product 10 is activated and loaded, transaction product 10 can be used by the consumer or any other bearer of transaction product 10 to purchase goods and/or services at the affiliated retail setting (e.g., a retail store or web site) or can be used in exchange for calling minutes, etc. In one embodiment, where transaction product 10 is displayed on a web site at 302, then, at 304, transaction product 10 may be activated in any suitable method and may not require the physical scanning of account identifier 136 to be activated or to otherwise access the associated account or record such as at 306.

In one example, at 308, the retail store or other affiliated retail setting or web site accepts transaction product 10 as payment toward the purchase of goods and/or services made by the current bearer of transaction product 10. In particular, the value currently loaded on transaction product 10 (i.e., stored or recorded in the account or record linked to account identifier 136) is applied toward the purchase of goods and/or services. At 310, additional value is optionally loaded on transaction product 10 at a point-of-sale terminal, kiosk or other area of the retail store, retail web site, or other related setting.

Upon accepting transaction product 10 as payment at 308, the retail store or related setting can subsequently perform either operation 308 again or operation 310 as requested by a current bearer of transaction product 10. Similarly, upon loading additional value on transaction product 10 at 310, the retail store or related setting can subsequently perform either operation 310 again or operation 308. In one example, the ability to accept transaction product 10 as payment for goods and/or services is limited by whether the account or record associated with transaction product 10 has any value stored or recorded therein at the time of attempted redemption.

Figure 16:
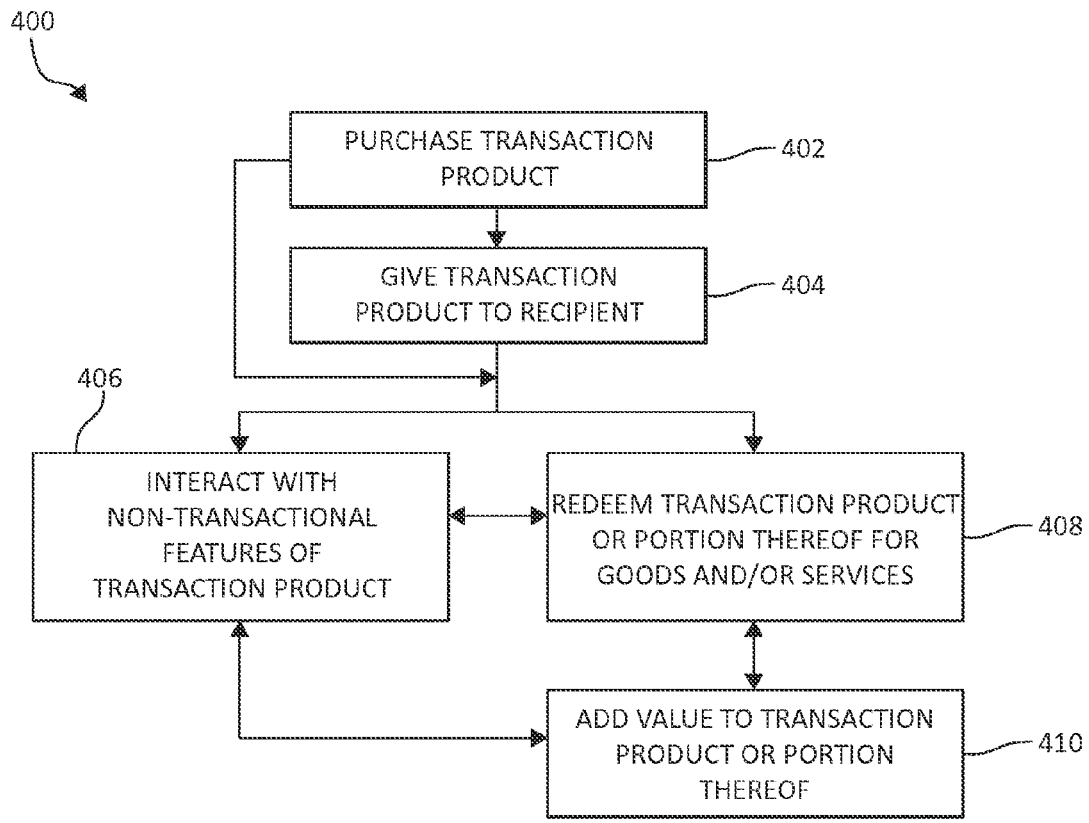
FIG. 16 is a flow chart illustrating a method of using a transaction product, according to one embodiment of the present invention.

FIG. 16 is a flow chart illustrating one embodiment of a method 400 of using transaction product 10 (e.g., FIGS. 1-6). At 402, a potential consumer of transaction product 10, which is displayed in a retail store or viewed on a web site, decides to and does purchase transaction product 10 from the retail store or web site. It should be understood that transaction product 10 can be displayed and purchased alone or as part of transaction product assembly 156 (FIGS. 12 and 13) along with backer 150.

Upon purchasing transaction product 10, a retail store employee, a retail store kiosk or other person or device scans account identifier 136 (FIG. 3), for example, through window 168 of backer 150 or otherwise reads or accesses account identifier 136. Upon accessing account identifier 136, the account or record linked to account identifier 136 is accessed and activated to load value onto transaction product 10 (i.e., load value to the account or record associated with transaction product 10). In one embodiment, such as where transaction product 10 is purchased at 402 via a web site, actual scanning or other mechanical detection of account identifier 136 may be eliminated and/or manual input of code 138 may be added.

At 404, the consumer optionally gives transaction product 10 to a recipient, such as a graduate, relative, friend, expectant parents, one having a recent or impending birthday, a couple having a recent or impending anniversary, etc. In one embodiment, a plurality of transaction products 10 are purchased and given to partygoers, such as at a birthday party, etc. as party favors or gifts. As an alternative, the consumer can keep transaction product 10 for his or her own use thereby eliminating operation 404.

At 406, the consumer, recipient or other current bearer of transaction product 10 interacts with transaction product 10. In one embodiment, playing or otherwise interacting with transaction product 10 at 406 includes sliding auxiliary member 14 in a first direction and observing the varying appearance of transaction product 10 due to the differing position of intermediate indicia 108 or other features of intermediated section 86 within window 70 and/or differing position of first and/or second end sections 88 and 90 relative to perimeter edge 26 of front panel 16. Other methods of sliding auxiliary member 14 and/or of presenting animation using a similar construction as that described above will be apparent to those of skill in the art upon reading this application. In one example, interaction with transaction product 10 at 406 amuses the bearer and any other observers of transaction product 10.

At 408, the consumer or recipient redeems transaction product 10 for goods and/or services from the retail store or web site. At 410, the consumer or recipient of transaction product 10 optionally adds value to transaction product 10, more particularly, to the account or record associated with account identifier 136 included therewith, at the retail store or over the Internet (i.e., via the web site). Upon playing with transaction product 10 at 406, redeeming transaction product 10 at 408 or adding value to transaction product 10 at 410, the consumer or recipient of transaction product 10 subsequently can perform either of operations 406, 408 or 410 as desired. In one embodiment, the ability of the consumer or recipient to repeat redeeming transaction product 10 at 410 is limited by whether the account or record linked with transaction product 10 has any remaining value stored or recorded therein at the time of attempted redemption.

Although primarily described above as occurring at a single retail store or web site, in one embodiment, purchasing transaction product 10 at 402, redeeming transaction product 10 at 408 and adding value to transaction product 10 at 410, can each be performed at any one of a number of stores adapted to accept transaction product 10 or over the Internet. In one example, each of the number of stores is part of a chain or a group of similarly branded stores. In one example, the number of stores includes at least one web site and/or at least one conventional brick and mortar store.

Transaction products come in many forms, according to embodiments of the invention. The gift card, like other transaction products, can be "re-charged" or "re-loaded" at the direction of the original consumer, the gift recipient or a third party. The term "loading on" or "loaded on" herein should be interpreted to include adding to the balance of an account or record associated with a transaction product. The balance associated with the transaction product declines as the transaction product is used, encouraging repeat visits or use. The transaction product remains in the user's purse or wallet, serving as an advertisement or a reminder to revisit the associated merchant. Gift cards according to embodiments of the invention provide a number of advantages to both the consumer and the merchant. Other transaction products according to embodiments of the invention include loyalty cards, merchandise return cards, electronic gift certificates, calling cards, employee cards, frequency cards, prepaid cards and other types of cards associated with or representing purchasing power, monetary value, etc.

Although the invention has been described with respect to particular embodiments, such embodiments are meant for illustrative purposes only and should not be considered to limit the invention. Various alternatives and changes will be apparent to those of ordinary skill in the art upon reading this application. Other modifications within the scope of the invention and its various embodiments will be apparent to those of ordinary skill.

What is claimed is:

1. A transaction product comprising:
a primary member defining a first panel and a second panel, wherein:
the first panel and the second panel are each substantially planar,
the first panel defines two or more embossed sections defining interior ledge segments facing one another to define a track therebetween, and
the first panel and the second panel are coupled to one another such that the track is interposed between the first panel and the second panel;
an auxiliary member interposed between the first panel and the second panel and at least partially positioned within the track, wherein:
the auxiliary member is configured to move within the track in one or more of a first direction and a second direction relative to the primary member, and
movement of the auxiliary member is limited in each of the one or more of the first direction and the second direction by interaction between the auxiliary member and the interior ledge segments of the two or more embossed sections; and
a machine-readable account identifier linking the primary member to an account or record, the machine-readable account identifier being secured to the primary member.

2. The transaction product of claim 1, wherein the account identifier is a bar code connected to the primary member.

3. The transaction product of claim 1, wherein the account identifier includes at least one of a bar code, a magnetic strip, a smart chip and a radio frequency identification (RFID) device.

4. The transaction product of claim 1, wherein the first panel and the second panel are adhered to each other.

5. The transaction product of claim 4, wherein the first panel and the second panel are free from being directly adhered to one another within the track.

6. The transaction product of claim 1, wherein the interior ledge segments are each sized to have a thickness greater than a thickness of the auxiliary member.

7. The transaction product of claim 1, wherein each of the first direction and the second direction are in a plane substantially parallel to the first panel of the primary member.

8. The transaction product of claim 1, wherein the first panel is formed as a single piece of material.

9. The transaction product of claim 8, wherein indentations are formed in a back surface of the first panel in shapes and positions corresponding with each of the two or more embossed sections.

10. The transaction product of claim 1, wherein the primary member is formed as a single piece of material with a fold line separating and directly bordering each of the first panel and the second panel.

11. The transaction product of claim 1, wherein the track is a first track, the two or more embossed sections also include at least two stop ledge segments extending in a direction substantially perpendicularly to the interior ledge segments to define a second track between the stop ledge segments, the first track limits movement of the auxiliary member in the first direction, and the second track limits movement of the auxiliary member in the second direction.

12. The transaction product of claim 11, wherein the first direction is substantially perpendicular to the second direction, movement of the auxiliary member is limited in a third direction by the first panel and the second panel, and the third direction is substantially perpendicular to each of the first direction and the second direction.

13. The transaction product of claim 11, wherein the auxiliary member includes a depending tab extending away from a remainder of the auxiliary member, and only the depending tab of the auxiliary member is positioned within the second track.

14. The transaction product of claim 1, further comprising a coded member secured to the primary member, wherein:
the account identifier is included on the coded member, and
the coded member is formed separately from the primary member.

15. The transaction product of claim 14, wherein indentations are formed in a back surface of the first panel in shapes and positions corresponding with each of the two or more embossed sections, and the coded member is secured to the back surface of the first panel in a manner covering the indentations.

16. The transaction product of claim 1, wherein the second panel of the primary member defines an aperture exposing an intermediate portion of the auxiliary member positioned between the first panel and the second panel, and the intermediate portion of the auxiliary member including indicia such that movement of the auxiliary member relative to the primary member moves the indicia within the aperture of the primary member.

17. An interactive product comprising:
a slidable member defining a first surface and a second surface opposite the first surface;
means for substantially covering the first surface of the slidable member, including:
means for limiting movement of the slidable member in a first direction while allowing movement of the slidable member in a second direction, and
means for limiting movement of the slidable member in the second direction to decrease inadvertent removal of the slidable member from the means for substantially covering the first surface of the slidable member, wherein the means for substantially covering the first surface is formed as a single piece of material, and each of the means for limiting are formed in an interior of the means for substantially covering the first surface spaced from an outer perimeter of the means for substantially covering the first surface;
means for substantially covering the second surface of the slidable member; and
means for coupling the means for substantially covering the first surface and the means for coupling the means for substantially covering the second surface to one another in a manner enclosing the means for limiting movement of the slidable member in the first direction, the means for limiting movement of the slidable member in the second direction, and a portion of the slidable member.

18. The interactive product of claim 17, further comprising:
means for substantially covering an exterior surface of the means for substantially covering the first surface of the slidable member opposite the slidable member, the means for covering the exterior surface including means for linking the stored-value product with at least one of an account and a record having a value associated therewith such that the stored-value product can be used as payment toward one of a use and a purchase of one or more of goods and services.

19. A method of forming an interactive device, the method comprising:
providing a primary member defining a first panel and a second panel, each of the first panel and the second panel defining an interior surface and an exterior surface;
using an embossing machine to emboss the primary member to form offset interior surfaces surrounded by interior ledges in the first panel, the interior ledges defining a first track between opposing substantially linear segments of the interior ledges;
placing an auxiliary member on the first panel, the auxiliary member including an intermediate portion fully maintained in the first track and a side portion extending from the intermediate portion beyond an outer edge of the first panel such that the auxiliary member is slidable in a first direction within the first track and has movement in a second direction substantially impeded by the opposing substantially linear segments of the interior ledges defining first track, the first direction being substantially perpendicular to the second direction; and
coupling the second panel to the first panel in a manner enclosing the auxiliary member and the first track between the first panel and the second panel.

20. The method of claim 19, further comprising: cutting a hole in the second panel, wherein following coupling the second panel to the first panel, the hole partially exposes the intermediate portion of the auxiliary member through the hole.

21. The method of claim 19, wherein using the embossing machine to emboss the primary member further comprises forming a second track between two of the interior ledges, the first track extends substantially in the first direction substantially parallel to the opposing substantially linear segments of the interior ledges, and the second track substantially extends in the second direction.

22. The method of claim 21, wherein the auxiliary member includes a stop segment extending away from the intermediate portion in the second direction, and placing the auxiliary member on the first panel includes placing the stop segment in the second track to limit overall movement of the auxiliary member in the first direction.

23. The method of claim 19, further comprising:
applying an account identifier to the primary member, wherein the account identifier links the interactive product to an account or record.

24. The method of claim 23, wherein applying the account identifier includes coupling a substantially planar card to the exterior surface of the first panel of the primary member to cover any indications of the embossing on the exterior surface of the first panel, and the substantially planar card includes the account identifier on a surface opposite the first panel of the primary member.

* * * * *